United States Patent Office 3,480,431
Patented Nov. 25, 1969

3,480,431
PHOTOGRAPHIC MATERIAL FOR A DRY COPYING METHOD

Wolfgang Lässig, Cologne-Stammheim, Alexander Riebel and Walter Püchel, Leverkusen, and Wolfgang Himmelmann, Cologne-Stammheim, Germany, assignors to Agfa-Gevaert Aktiengesellschaft, Leverkusen, Germany, a corporation of Germany
No Drawing. Filed Oct. 23, 1965, Ser. No. 504,144
Claims priority, application Germany, Nov. 9, 1964, A 47,553
Int. Cl. G03c 5/04, 1/76
U.S. Cl. 96—27 4 Claims

ABSTRACT OF THE DISCLOSURE

The present invention relates to a photographic material for a dry copying process, which material contains a uniformly dyed layer and an azopyrazolone of the formula:

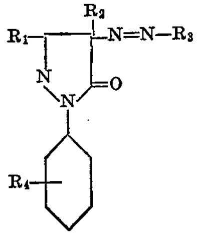

wherein $R_1$=a substituent of the class consisting of hydrogen, alkyl up to 20 carbon atoms, phenyl, cycloalkyl, aralkyl, amino, alkylamino, acylamino, hydroxyl and alkoxy; $R_2$=a substituent of the group consisting of alkyl, olefinically unsaturated alkyl, carboxyl substituted alkyl, carbalkoxy substituted alkyl, phenyl substituted alkyl, phenyl, nitrile and the members that with $R_1$ complete a cyclopentyl, cyclohexyl, morphonyl or piperidyl ring; $R_3$=a radical of the phenyl series; $R_4$=a substituent of the groups consisting of hydrogen, alkyl, phenyl, amino, alkylamino, acylamino, sulfo, sulfonamide, alkylsulfonamide, carboxy, carbalkoxy, carbamyl, nitride, nitro, alkoxy and halogen which decomposes on heating, giving off nitrogen.

It is known that materials which are not sensitive to normal exposure and which contain a uniformly dyed layer, a so-called grey layer, can be exposed to an electronic flash of high energy for the production of an image, the pigment contained in the layer, e.g., colloidally dispersed silver in a gelatin layer, absorbing the light in the exposed areas and heating up in the process to a temperature at which the binder is decomposed with formation of fine gas bubbles. The exposed parts of the layer are brightened by the formation of these gas bubbles, with the result that a positive image of the original is produced. The layers can be exposed to light either reflected from or transmitted through the originals. In the case of exposure by the reflex process, in which the grey layer is in contact with the original, the surface elements of the copying layer engaging to the white areas of the original are more highly illuminated by the reflex radiation, and this leads, by way into thermal energy of conversion of the light energy absorbed by the pigment, to a more intense heating for a short time and hence decomposition of these parts of the layer. If the copying material is placed with the support of the dyed layer in contact with the original, a non-reversed copy of the original is obtained. In this copy of dyed surface generally shows the original color of the layer, and white areas are produced as a result of the brightening.

In addition, it is known that the sensitivity of such dyed layers as well as the contrast of the resulting copies can be improved by incorporating into the copying material a heat sensitive organic compound which decomposes with evolution of gas. As suitable compounds there have been mentioned, among others, diazonium salts, oragnic azides and nitrosamines as well as easily decomposable organic carboxylic acids. The effectiveness of such additives and hence the sensitivity of such copying material depends on the decomposition temperature of the organic compound incorporated. In contrast to the so-called vesicular or light scattering photographic processes, these compounds do not need to be sensitive to light. In fact, it is preferred to use compounds which are not light-sensitive because then the material to be used for the present process is as a whole insensitive under normal exposure conditions and therefore easier to handle.

The principal object of the present invention is to effect an increase in photographic speed by providing a dyed layer which contains a compound stable in normal daylight but which exhibits vigorous formation of gas bubbles at a temperature of about 60° C. The sensitivity of the copying material increases with decreasing decomposition temperature of the organic compound and the flashlamp energy required for exposure decreases with increasing sensitivity of the material.

The above object has been attained by providing a supported dyed layer which contains as compounds that are decomposed by the heat, derivatives of pyrazolone-(5) or of pyrazoloneimine-(5) which are substituted in the 4-position by a monovalent organic radical and an aryl azo group, in particular a phenyl azo group. In particular, azo pyrazolones of the following formula are suitable:

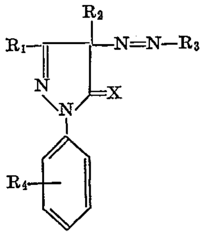

wherein

X=oxygen or an imino group, $R_1$=(1) hydrogen, (2) alkyl preferably having 1–20, in particular 1–5 C-atoms such as methyl; (3) aryl, preferably phenyl; (4) cycloalkyl such as cyclohexyl; (5) aralkyl such as phenylethyl or benzyl; (6) amino which may be substituted by alkyl, preferably with 1–6 C-atoms or acyl radicals, and particularly those which can be derived from aliphatic carboxylic acids saving 1–20 C-atoms; (7) hydroxyl or (8) alkoxy, preferably having up to 5 C-atoms;

$R_2$=(1) saturated or olefinically unsaturated alkyl, preferably having up to 5 C-atoms, such as methyl, ethyl or allyl, which alkyl radicals may be substituted, e.g., with carboxy (or carboxyl groups which are esterified preferably with lower aliphatic alcohols having up to 3 C-atoms) alkyl, (2) aralkyl such as phenylethyl or benzyl, (3) aryl, preferably phenyl or (4) nitrile;

$R_3$=aryl such as naphthyl, in particular phenyl, which may be substituted, for example, with at least one of the following substituents, alkyl preferably having 1–5 C-atoms such as methyl, aryl, preferably phenyl; amino which may be substituted, e.g., with alkyl preferably having 1 to 6 C-atoms or acyl radicals, in particular those which can be derived from aliphatic carboxylic acids having 1–20 C-atoms; octyl mercapto; sulfo; sulfoamide; substituted sulphonamide, carboxyl; esterified carboxyl; carbonamide; nitrile; nitro; hydroxyl; alkoxy having preferably up to 5 C-atoms; halogen such as chlorine or bromine and the like;

$R_4$=H or alkyl, preferably having 1–5 C-atoms such as methyl; aryl, preferably phenyl; amino groups which may be substituted, e.g., with alkyl preferably having 1–6 C-atoms or acyl radicals, in particular those which can be derived from aliphatic carboxylic acids having 1–20 C-atoms; sulfo; sulfonamide; alkyl substituted sulfonamide; carboxyl; esterified carboxyl; carbonamide; nitrile; nitro; hydroxyl; alkoxy having preferably up to 5 C-atoms; or halogen such as chlorine or bromine and the like;

$R_1$ and $R_2$ may together represent the ring members necessary to complete a 5- or 6-membered alicyclic or heterocyclic ring. Such rings are, for example, cyclopentyl, cyclohexyl, morphonyl or piperidyl.

Examples of suitable compounds are:

decomposition temperature

I

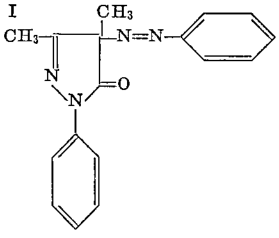

74°

II

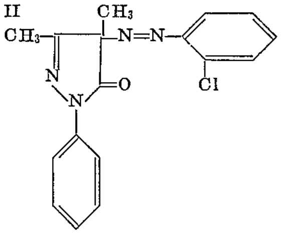

52°

III

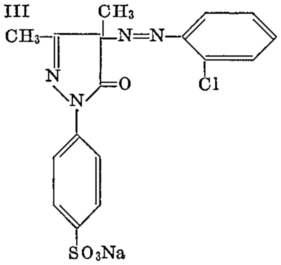

65°

IV

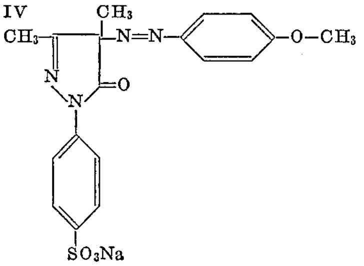

65°

V

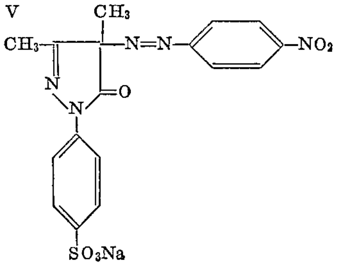

75° decomposition temperature

VI

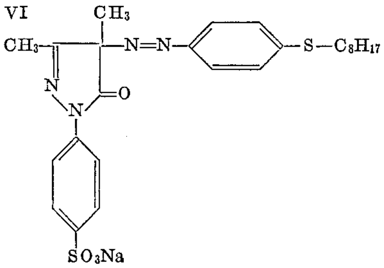

60°

VII

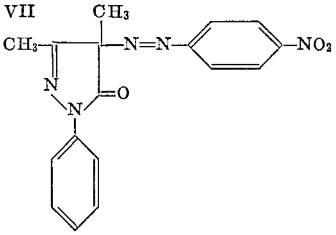

72°

VIII

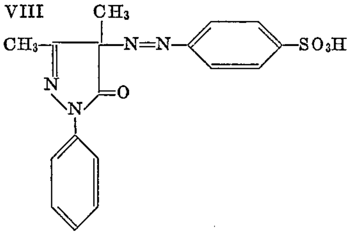

75°

IX

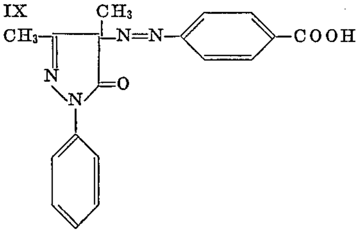

95°

X

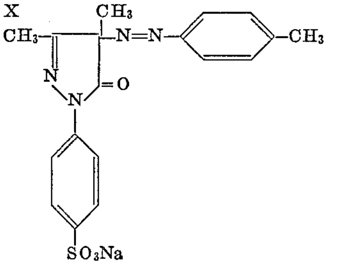

58°

XI

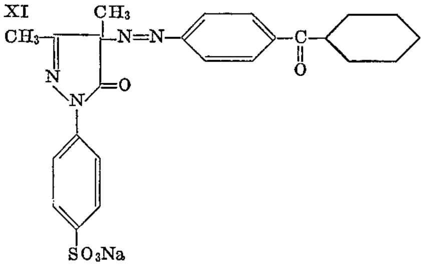

95°

XII

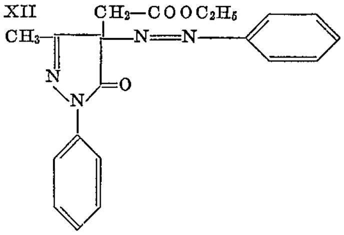

78° decomposition temperature
XIII
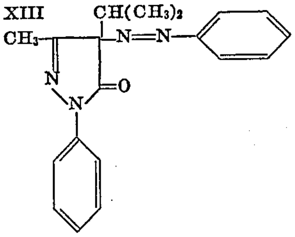
60°
XIV
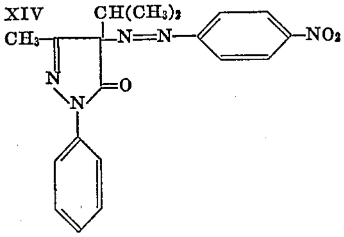
76°
XV
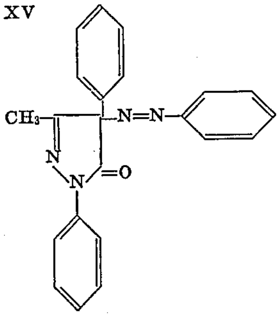
54°
XVI
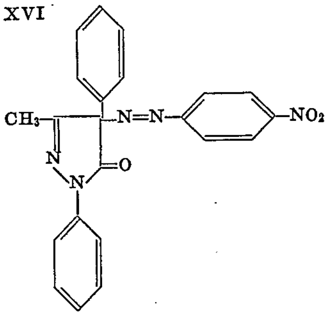
68-70°
XVII
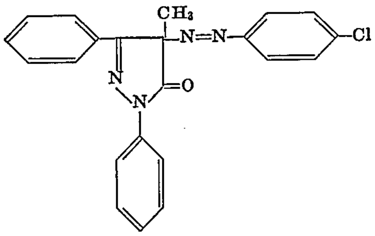
97°
XVIII
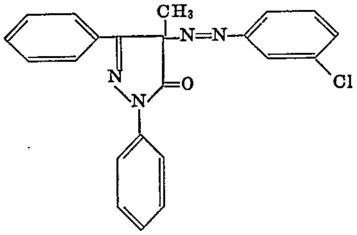
70°
decomposition temperature
XIX
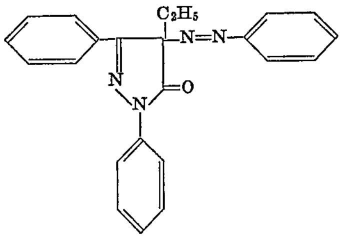
96°
XX
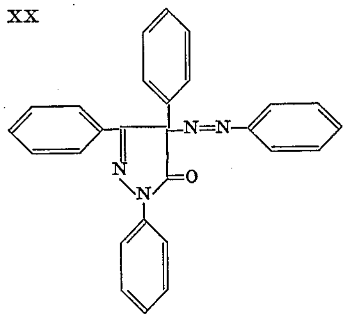
75°
XXI
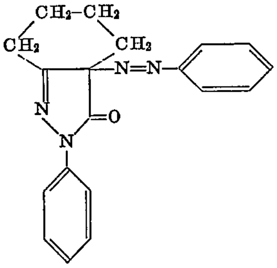
79°
XXII
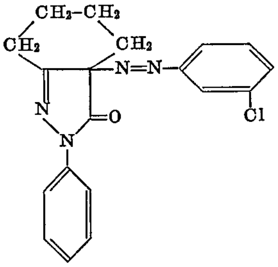
75°
XXIII
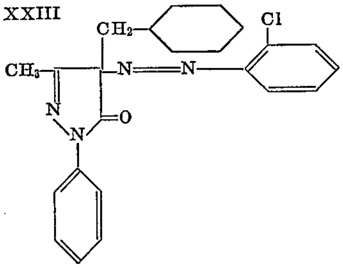
95°
XXIV
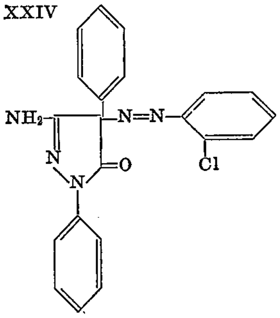
80°

The azopyrazolones of the invention can be prepared by coupling a diazonium salt containing the radical $R_3$ with the corresponding pyrazolones in solution buffered with sodium acetate or a solution mixture of acetone and pyridine, see e.g. Angewandte Chemie, 72 page 967 (1960).

The preparation of two compounds is described in detail below, in one case with an unsubstituted 1-phenyl group and in the other case with a substituted 1-phenyl group. Other azopyrazolones are prepared in analogous manner.

Compound II (of the above-listed group)

12 g. of 2-chloroaniline are dissolved in
20 ml. of water and
30 ml. of heated conc. aqueous HCl and cooled to 0° with stirring. The solution is diazotized with a solution of 7 g. of sodium nitrite in
15 ml. of water. After removal of the excess of nitrite with amidosulfonic acid, the product is slowly run into a solution of
19 g. of 3:4-dimethyl-1-phenyl-1:2-pyrazoline-(5) in
50 ml. of acetone and
40 ml. pyridine and
100 ml. of water.

Water is then added. The oil which separates out crystallizes when triturated. The product is filtered with suction and recrystallized from propanol, yellow prismatic crystals being obtained. Yield: 23 g. Decomposition point 52° C.

Compound III (of the above-listed group)

12 g. of 2-chloroaniline are dissolved in
60 ml. of water and
25 ml. of heated conc. HCl. The solution is cooled to 0° with stirring, and a solution of
7 g. of sodium nitrite in
10 ml. of water is added dropwise. After removal of the excess nitrite with amidosulfonic acid, this mixture is slowly run into a solution of
17 g. of 3:4-dimethyl-1-p-sulfonic acid phenyl-1:2-pyrazolone-(5) and
16 g. of anhydrous sodium acetate in
200 ml. of 1 N NaOH, with stirring.

Crystallization of compound III as the sodium salt in the form of fatty, pale yellow platelets sets in after a few minutes. Yield: 34 g. Decomposition point 65° C.

The copying materials which according to the invention contain azopyrazolones can be built up in many different ways. In principle, the finely divided dye and the azopyrazolone may be arranged either in the same or in different layers.

The azopyrazolones are added in the usual manner so that they are contained in the layer either in solution or in dispersion or in the emulsified form. If the azopyrazolones are incorporated in the form of emulsions, they are dissolved in higher boiling organic liquid or in a resin which is itself not soluble in the actual binder and are then incorporated in the binder by emulsification of this solution.

The concentration of the azopyrazolones in the dyed layer or in an adjacent layer can vary widely, e.g., from about 0.04 to 1 g./m.$^2$. The particular quantity will vary, depending upon the effects desired, the decomposition temperature of the azopyrazolone, the dye content of the dyed layer etc. In general about 60 to 400 mg. of the azopyrazolone per square meter will suffice to produce the desired effect.

Any binder may be used for the layers which contain the pigment and/or the azopyrazolone. Preferred binders are hydrophilic film-forming products such, for example, as carboxymethyl cellulose, polyvinyl alcohol, alginates, carrageenates or proteins. Gelatin has quite exceptional properties for this purpose.

The following are suitable as hydrophobic binders: Homo- and copolymers of styrene and its derivatives, vinyl chloride, vinylidene chloride, vinyl acetate, vinyl alkyl ethers, vinyl alkyl ketone, vinyl carboxylic acid esters, vinyl pyrrolidone, polyamides such as polycaprolactam, polycondensates of diamines and dicarboxylic acids, polyurethanes, polycarbonates etc. The type of dispersing agent or solvent suitable for the azopyrazolones if the latter are employed in emulsified form depends on the type of layer-forming binder. If this is a hydrophilic colloid then the following are examples of suitable solvents or dispersing agents: Ethyl acetate, benzene, xylene, chlorinated hydrocarbons, higher alcohols, organic solvents generally not miscible with water, if desired with addition of a so-called crystalloid such as phthalic acid diester.

The copying material may also be built up in such a way that the pigment is in the disperse phase. If hydrophilic binders are used as the uppermost layer, it is in some cases advantageous to apply a protective layer of hydrophobic materials which are not soluble in water. Such a layer does not affect the copying process but merely serves to increase the resistance of the copying material to moisture.

If the pigment and the azopyrazolones are employed in separate layers, these layers may be arranged in any desired sequence on the support. Thus, the azopyrazolone layer may be present as the uppermost layer or between the support and the pigment layer. It is merely necessary to ensure that exposure as well as subsequent viewing of the copy takes place through the azopyrazolone layer. Considerably higher contrasts as well as purer whites in the image are obtained with this arrangement of layers.

As support for the copying materials in which azopyrazolones are employed in the manner according to the invention, one may use sheet materials, preferably transparent films. The expression "transparent" in this connection refers to the light used for copying, which consists mainly of light of wavelengths between 0.3μ and 1μ. The underlying foundation may consist of the usual film-forming materials such as cellulose esters, in particular cellulose acetates, polyvinyl chloride, polycarbonate, especially if based on bis-hydroxyphenyl alkane, polyesters, preferably those based on polyethylene terephthalic esters, and similar polymeric products. Paper is also suitable, especially transparent paper of the usual composition and origin.

In principle, any pigments that absorb the copying light and become heated in the process are suitable, for example, the following: Carbon black, graphite, metal oxides such, fore example, as manganese oxide, metal sulfides such as lead sulfide as well as finely divided metals, in particular finely divided silver.

As source of light there is used a photo-flash tube, a so-called electronic flash having an output of 300 to 5000 watt seconds and a flash time of $10^{-4}$ to $10^{-2}$ seconds. Such flash tubes are already in use in studio flash instruments, e.g., those marketed by the firm of Mannesmann, Ingenieur- and Apparatebau, Koeln-Porz.

Copying materials which can be used in accordance with the invention have also been described in French Patents 1,312,209 and 1,417,929.

A suitable exposure apparatus, especially for the production of reflex copies, has been described in German patent specification (A 46 218 IXa/57c).

EXAMPLE 1

A cellulose triacetate foil 60μ in thickness is first covered with an adhesive layer for gelatin layers and over this is cast a mixture of 14 ml. of 10% gelatin solution containing 18 g. of colloidal black silver/liter,
280 ml. of 7% gelatin,
20 ml. of 5% aqueous solution of di-isobutylnaphthalic-1-sulfonic acid sodium to produce a grey layer having an optical density of 0.48

(in white light). Thereafter the grey layer is impregnated with a solution of 5 g. of compound III (of the above-listed group) in
100 ml. of water and
5 ml. of 3% formalin and
10 ml. of 5% aqueous solution of sodium di-isobutyl-naphthalic-1-sulfonate.

The treated material is dried. The dyed layer is placed into contact with the original to be reproduced and reflex-exposed to an electronic flash of about 1000 watt-seconds at a distance of 40 mm. A non-reversed copy of the original having a high contrast is obtained.

EXAMPLE 2

The procedure is the same as described in Example 1 except that the dyed layer is coated with a mixture of 55 ml. of 10% aqueous solution of compound III,
110 ml. of 8% gelatin
5 ml. of 3% formalin
10 ml. of 5% aqueous solution of sodium di-isobutyl-naphthalic-1-sulfonate.

On drying, a copying material is obtained which requires a slightly higher energy of light on exposure than in Example 1. The contrast of the final image, however, is improved.

EXAMPLE 3

The procedure is as described in Example 1 except that the dyed layer is coated with a dispersion which is prepared as follows:

50 g. of a polyamide consisting of a mixed condensate of equal parts of adipic acid and hexamethylene diamine, adipic acid and diaminocyclohexylmethane, and ε-caprolactam (e.g. the product marketed by the Badische Anilin- & Soda-Fabrik AG., Ludwigshafen, under the trade name Ultramid 1C) are dissolved in
300 ml. of hot butanol. The solution is rapidly cooled to 30° C. and
15 g. of compound II are stirred in until dissolved.

The resulting solution is emulsified in 750 ml. of 8% gelatin with the addition of
5 g. of sodium paraffin sulfonate as wetting agent, using a high speed stirrer.

On drying, a copying material is obtained which when exposed as described in Example 1 yields a high-contrast non-reversed copy which is resistant to moisture by virtue of having a protective film.

EXAMPLE 4

The procedure is as described in Example 1. However, the copying material is coated in a third coating process with the following solution:

36 ml. of copolymer of vinylidene chloride with vinyl chloride as 60% aqueous dispersion,
1 ml. of hexane-1:6-diol are dispersed in
75 ml. of 4% gelatin and treated with
3 ml. of a 5% aqueous saponin solution and
9 ml. of a 3% aqueous formalin solution.

The copying layer thus obtained shows similar behaviour on exposure as that described in Example 3.

EXAMPLE 5

The procedure is as in Example 1 except that the dyed layer is coated with a dispersion which has been prepared as follows:

3 g. of polymethylmethacrylate are dissolved hot in
18 ml. of 1:1:1-trichloroethylene. When the solution has been cooled to 30° C.,
1 g. of compound XXII is added with stirring until dissolved. This solution is then emulsified in
50 ml. of 7% gelatin with the addition of
0.5 g. of sodium paraffin sulfonate. When this has been mixed with 12 g. of copolymer of vinylidene chloride with vinyl chloride as 60% aqueous dispersion and
80 ml. of water, the solution is ready for casting.

A highly sensitive copying material is obtained which when processed as in Example 1 yields water-resistant copies.

EXAMPLE 6

A transparent paper having an optical density of about 0.1 in white light is coated with a solution of .5 g. of polyvinyl pyrrolidone in
100 ml. of methanol in which
0.08 g. of bismuth has been colloidally dispersed with the aid of a high frequency arc.

A grey layer is obtained which has an optical density of 0.36 in white light. The first layer is now coated with a solution of 10 g. of polymethylmethacrylate and
2.5 g. of compound II in
115 ml. of 1:1:1-trichloroethylene and
35 ml. of methanol.

A copying material is obtained which when exposed as described in Example 1 only requires a light energy of about 850 watt-seconds and yields water-resistant copies.

EXAMPLE 7

A transparent paper having an optical density of 0.5 in white light is coated with a solution of 75 ml. of 10% gelatin and 5 ml. of 5% aqueous solution of sodium di-disobutyl - naphthalic - 1 - sulphonate. The resulting gelatin layer has a thickness of 22μ. It is impregnated with a solution of 3 g. of compound III in
40 ml. of water and
30 ml. of 0.3% formalin by immersion.

The thus treated layer is overcoated with a mixture of 8 ml. of 10% gelatin solution containing
18 g. of colloidal black silver per liter,
120 ml. of 7% gelatin,
6 ml. of 0.1 N-sodium hydroxide and
5 ml. of 5% saponin to form a grey layer having an optical density of 0.52 in white light.

The resulting copying material is placed with its grey layer in contact with the original for exposure. By reflex-exposure to a flash energy of about 700 watt-seconds at a distance of 40 mm., a high-contrast copy of the original is obtained, which can be viewed as non-reversed copy through the support.

EXAMPLE 8

The procedure is as described in Example 7, but impregnation is with a solution of compound IV. After impregnation the material is coated with a grey layer of the following mixture:

36 ml. of copolymer of vinylidene chloride with vinyl chloride as 60% aqueous dispersion and
1 ml. of hexane-1:6-diol are emulsified in a solution of
8 ml. of 10% gelatin containing
18 g. of colloidal black silver per liter and
35 ml. of water,
10 ml. of a 20% emulsion of dibutylphthalate,
9 ml. of 3% formalin and
5 ml. of 5% saponin.

A grey layer having an optical density of 0.47 in white light is obtained.

The dyed layer is reflex-exposed while in contact with the original as described in Example 7. High contrast copies which are resistant to water are obtained. These copies are to be viewed through the support.

The compounds used in the above examples can be replaced as desired by other azopyrazolones such as described in the above listed.

What is claimed is:

1. In a photographic copying member having a copying layer containing a material which upon imagewise high-energy flash-lamp exposure decomposes to give a visible image, the improvement according to which the decomposable material has the formula:

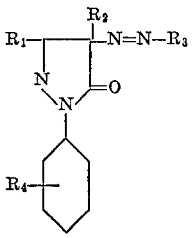

wherein $R_1$=stands for a substituent of the class consisting of hydrogen, alkyl having up to 20 carbon atoms, phenyl, cycloalkyl, aralkyl, amino, alkyl substituted amino, acyl substituted amino, hydroxyl and alkoxy;

$R_2$=represents a substituent of the group consisting of alkyl, olefinically unsaturated alkyl, carboxyl substituted alkyl, carbalkoxy substituted alkyl, phenyl substituted alkyl, phenyl, nitrile and the members that with $R_1$ complete a cyclopentyl, cyclohexyl, morphonyl or piperidyl ring;

$R_3$=stands for a radical of the phenyl series;

$R_4$=represents a substituent of the group consisting of hydrogen, alkyl, phenyl, amino, alkyl substituted amino, acyl substituted amino, sulfo, sulfonamide, alkyl substituted sulfonamide, carboxy, carbalkoxy, carbamyl, nitrile, nitro, hydroxyl, alkoxy and halogen.

2. In the process of photographically copying images by exposing to an image a copying layer containing a material which upon imagewise high-energy flash-lamp exposure decomposes to give a visible image, the improvement according to which the decomposable material has the formula:

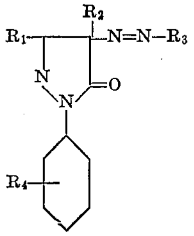

wherein $R_1$=stands for a substituent of the class consisting of hydrogen, alkyl having up to 20 carbon atoms, phenyl, cycloalkyl, aralkyl, amino, alkyl substituted amino, acyl substituted amino, hydroxyl and alkoxy;

$R_2$=represents a substituent of the group consisting of alkyl, olefinically unsaturated alkyl, carboxyl substituted alkyl, carboalkoxy substituted alkyl, phenyl substituted alkyl, phenyl, nitrile and the members that with $R_1$ complete a cyclopentyl, cyclohexyl, morphonyl or piperidyl ring;

$R_3$=stands for a radical of the phenyl series;

$R_4$=represents a substituent of the group consisting of hydrogen, alkyl, phenyl, amino, alkyl substituted amino, acyl substituted amino, sulfo, sulfonamide, alkyl substituted sulfonamide, carboxy, carbalkoxy, carbamyl, nitrile, nitro, hydroxyl, alkoxy and halogen.

3. The combination of claim 1 in which the material that decomposes is carried by a layer that also contains a pigment that absorbs visible light.

4. The combination of claim 1 in which the material that decomposes is carried by a gelatin layer.

References Cited

UNITED STATES PATENTS

| | | | |
|---|---|---|---|
| 1,976,302 | 10/1934 | Sheppard et al. | 96—88 XR |
| 2,897,090 | 7/1959 | Dam | 96—88 XR |
| 3,134,672 | 5/1964 | Blout et al. | 260—162 XR |

NORMAN G. TORCHIN, Primary Examiner

R. E. MARTIN, Assistant Examiner

U.S. Cl. X.R.

96—67